(12) United States Patent
Oh

(10) Patent No.: US 8,514,437 B2
(45) Date of Patent: Aug. 20, 2013

(54) IMAGE FORMING APPARATUS AND CONTROL METHOD THEREOF

(75) Inventor: Han-sang Oh, Seoul (KR)

(73) Assignee: Samsung Electronics Co., Ltd., Suwon-Si (KR)

(*) Notice: Subject to any disclaimer, the term of this patent is extended or adjusted under 35 U.S.C. 154(b) by 629 days.

(21) Appl. No.: 12/801,057

(22) Filed: May 19, 2010

(65) Prior Publication Data

US 2011/0128569 A1 Jun. 2, 2011

(30) Foreign Application Priority Data

Dec. 2, 2009 (KR) .................... 10-2009-0118769

(51) Int. Cl.
*G06F 15/00* (2006.01)

(52) U.S. Cl.
USPC .......... 358/1.15; 358/498; 271/3.14; 271/278

(58) Field of Classification Search
USPC .................. 358/1.15, 498; 271/3.14, 278
See application file for complete search history.

(56) References Cited

U.S. PATENT DOCUMENTS

| 4,042,914 | A * | 8/1977 | Curley et al. .................... 710/23 |
| 5,365,311 | A * | 11/1994 | Matsuoka ........................ 399/13 |
| 5,525,031 | A * | 6/1996 | Fox ............................ 414/789.7 |
| 2002/0097413 | A1* | 7/2002 | Watanabe et al. ............. 358/1.12 |
| 2003/0102619 | A1* | 6/2003 | Tamai et al. ................ 270/58.18 |
| 2003/0198494 | A1 | 10/2003 | Kenji et al. |
| 2003/0230841 | A1* | 12/2003 | Hiramoto et al. ............ 271/3.14 |

FOREIGN PATENT DOCUMENTS

KR  2003-0082733  10/2003

* cited by examiner

*Primary Examiner* — Thomas D Lee
*Assistant Examiner* — Mark Milia
(74) *Attorney, Agent, or Firm* — Staas & Halsey LLP

(57) ABSTRACT

An image forming apparatus including a main body having an image forming unit forming an image to a printing medium; and a plurality of mail box modules which are disposed to an output side of the printing medium in the main body, each mail box module respectively including a driving unit selectively outputting the printing medium from the main body, and a control circuit unit controlling the driving unit. The control circuit unit includes a shift register having channels corresponding to the total number of the plurality of mail box modules, and, if receiving an identifying ID information of the mail box module from the main body, turns on one channel of the channels corresponding to the identifying ID information; and a multiplexer which outputs an active signal to the driving unit if the channel turned on by the shift register corresponds to a predetermined identifying ID.

18 Claims, 9 Drawing Sheets

IMAGE FORMING APPARATUS AND CONTROL METHOD THEREOF

CROSS-REFERENCE TO RELATED APPLICATIONS

This application claims priority from Korean Patent Application No. 10-2009-0118769, filed on Dec. 2, 2009 in the Korean Intellectual Property Office, the disclosure of which is incorporated herein by reference.

BACKGROUND

1. Field

An apparatus and a method relate to an image forming apparatus and a control method thereof forming an image on a printing medium, and more particularly, to an image forming apparatus and a control method thereof employing an option box module such as a mail box module classifying an printing medium output from an image forming apparatus main body to selectively load.

2. Description of the Related Art

An image forming apparatus is an apparatus forming a visible image by a developer, an ink, etc. on a printing medium, and is generally embodied by a printer, an electronic copier, a multifunction device, etc. The image forming apparatus may mount an option box module of various types to an image forming apparatus main body to expand a function of the main body, and there is a mail box module for post-processing a printing medium output from the main body in the option box module.

A plurality of mail box modules applied to the image forming apparatus are stacked to have a plurality of steps with respect to the main body to be coupled. Each mail box module includes an output tray in which a printing medium is loaded, and a guide selectively guiding a printing medium output from the main body to the output tray. Also, the main body module includes a driving unit driving the guide, and a microprocessor controlling the driving unit.

If the microprocessor of each mail box module determines that an identifying ID information received from the main body corresponds to the mail box module itself, the microprocessor controls an operation of the guide so that a printing medium can be output to the output tray itself.

However, in the conventional configuration, to control the driving unit of each mail box module, it is necessary to mount the microprocessor having a high cost. As the number of the mail box module coupled to the main body increases, the cost burden by the microprocessor increases.

In directly controlling the driving unit of each mail box module by a controller of the main body without installing the microprocessor to each mail box module, the configuration of the controller of the main body becomes complicated. Also, since a signal line is disposed by each driving unit from the controller of the main body, the wiring configuration becomes complicated, and an additional expansion of the mail box module is difficult.

SUMMARY

Accordingly, one or more exemplary embodiments provide an image forming apparatus and a control method embodying and employing an option box module employing a logic circuit having a relatively low cost in an expansion type option box module such as a mail box module mounted to a main body, instead of employing a microprocessor having a high cost.

Another exemplary embodiment provides an image forming apparatus and a control method thereof simply embodying a signal wiring configuration connected to each mail box module from a controller of a main body.

The foregoing and/or other aspects may be achieved by providing an image forming apparatus, including: a main body which includes an image forming unit forming an image to a printing medium; and a plurality of mail box modules which are disposed to an output side of the printing medium in the main body to have a plurality of steps, and respectively include a driving unit driving so that the printing medium can be selectively output from the main body, and a control circuit unit controlling a driving of the driving unit, the control circuit unit of one of the mail box modules including: a shift register which includes channels corresponding to the total number of the plurality of mail box modules, and, if receiving an identifying ID information of the mail box module from the main body, turns on one channel of the channels corresponding to the identifying ID information; and a multiplexer which outputs an active signal driving the driving unit to the driving unit if the channel turned on by the shift register corresponds to a predetermined identifying ID.

The respective control circuit units of the mail box modules may share a signal line receiving the identifying ID information from the main body.

The control circuit unit may include an ID setting unit which sets the identifying ID.

The one mail box module may include an output tray on which the printing medium is loaded; and a sensor which outputs a sensing signal to the control circuit unit if the printing medium is loaded on the output tray by equal to or more than a predetermined amount, and the control circuit unit may output the sensing signal to the main body if the identifying ID information received from the main body corresponds to the predetermined identifying ID when receiving the sensing signal.

The control circuit unit may include a second shift register which includes a plurality of channels, and selectively turns on the channels to correspond to the identifying ID information received from the main body; and a comparing unit which compares whether a turned on state of the plurality of channels of the second shift register corresponds to the predetermined identifying ID or not, and selectively outputs the sensing signal from the sensor depending on a comparison result.

The comparing units of the respective mail box modules may be connected mutually by an open collector output to share a signal line outputting the sensing signal to the main body.

The main body may include a main body control unit which outputs the identifying ID of one mail box module to the plurality of mail box modules so that the printing medium formed with an image can be output to the one mail box module of the plurality of mail box modules.

The main body control unit may determine that a printing medium loaded amount of the mail box module corresponding to the output identifying ID is equal to or more than a predetermined amount to display an error message in a display unit of the main body if receiving the sensing signal from the plurality of mail box modules.

One of the mail box modules may include an output tray on which the printing medium is loaded; and a guide which is moved by the driving unit to selectively guide the printing medium output from the main body to the output tray.

Another aspect may be achieved by providing an image forming apparatus, including: a main body which includes an image forming unit forming an image to a printing medium;

and a plurality of supplying box modules which are disposed to an input side of the printing medium in the main body to have a plurality of steps, and respectively include a loading tray on which the printing medium is loaded, a driving unit driving to selectively supply the loaded printing medium to the main body, and a control circuit unit controlling a driving of the driving unit, the control circuit unit of one of the supplying box modules including: a shift register which includes channels corresponding to the total number of the plurality of supplying box modules, and, if receiving an identifying ID information of the supplying box module from the main body, turns on one channel of the channels corresponding to the identifying ID information; and a multiplexer which outputs an active signal driving the driving unit to the driving unit if the channel turned on by the shift register corresponds to a predetermined identifying ID.

The respective control circuit units of the supplying box modules may share a signal line receiving the identifying ID information from the main body.

The control circuit unit may include an ID setting unit which sets the identifying ID.

The one supplying box module may include a sensor which outputs a sensing signal to the control circuit unit if the amount of the printing medium loaded on the loading try is equal to or less than a predetermined amount, and the control circuit unit may output the sensing signal to the main body if the identifying ID information received from the main body corresponds to the predetermined identifying ID when receiving the sensing signal.

The control circuit unit may include a second shift register which includes a plurality of channels, and selectively turns on the channels to correspond to the identifying ID information received from the main body; and a comparing unit which compares whether a turned on state of the plurality of channels of the second shift register corresponds to the predetermined identifying ID or not, and selectively outputs the sensing signal from the sensor depending on a comparison result.

The comparing units of the respective supplying box modules may be connected mutually by an open collector output to share a signal line outputting the sensing signal to the main body.

The main body may include a main body control unit which outputs the identifying ID of one supplying box module to the plurality of supplying box modules so that the printing medium loaded on the one supplying box module of the plurality of supplying box modules can be supplied to the image forming unit.

The main body control unit may determine that a printing medium loaded amount of the supplying box module corresponding to the output identifying ID is equal to or less than a predetermined amount to display an error message in a display unit of the main body if receiving the sensing signal from the plurality of supplying box modules.

One of the supplying box modules may include a pickup roller which is driven by the driving unit to pick up the printing medium on the loading tray to be supplied to the main body.

Another aspect may be achieved by providing an option box module of an image forming apparatus which is disposed to an image forming apparatus main body in plural to have a plurality of steps, and performs an input or an output of a printing medium with respect to the main body to be classified by each step, the option box module of the image forming apparatus including: a driving unit which drives to perform an input or an output of the printing medium with respect to the image forming apparatus main body; and a control circuit unit which controls a driving of the driving unit, the control circuit unit including: a shift register which includes channels corresponding to the total number of the plurality of option box modules, and, if receiving an identifying ID information of the option box module from the main body, turns on one channel of the channels corresponding to the identifying ID information; and a multiplexer which outputs an active signal driving the driving unit to the driving unit if the channel turned on by the shift register corresponds to a predetermined identifying ID.

Another aspect may be achieved by providing a control method of an image forming apparatus which includes a main body forming an image to a printing medium, and a plurality of mail box modules respectively including a driving unit driving so that the printing medium can be output from the main body and disposed to the main body to have a plurality of steps, the control method of the image forming apparatus including: commonly transmitting an identifying ID information corresponding to one mail box module selected among the plurality of mail box modules to the plurality of mail box modules from the main body; selectively driving the driving unit of the mail box module corresponding to the identifying ID information among the plurality of mail box modules receiving the identifying ID information; and outputting the printing medium from the main body by the mail box module which the driving unit drives.

The commonly transmitting the identifying ID information may include receiving by the main body a sensing signal informing that the printing medium is loaded by equal to or more than a predetermined amount from the plurality of mail box modules; and determining by the main body that the printing medium is loaded by equal to or more than the predetermined amount to the mail box module corresponding to the identifying ID information among the plurality of mail box modules if receiving the sensing signal.

Another aspect may be achieved by providing a control method of an image forming apparatus which includes a main body forming an image to a printing medium, and a plurality of supplying box modules respectively including a driving unit driving to load the printing medium and to supply the loaded printing medium to the main body, the control method of the image forming apparatus including: commonly transmitting an identifying ID information corresponding to one supplying box module selected among the plurality of supplying box modules to the plurality of supplying box modules from the main body; selectively driving the driving unit of the supplying box module corresponding to the identifying ID information among the plurality of supplying box modules receiving the identifying ID information; and supplying the printing medium loaded in the supplying box module which the driving unit drives to the main body by the driving of the driving unit.

The commonly transmitting the identifying ID information may include receiving by the main body a sensing signal informing that the loaded amount of the printing medium is equal to or less than a predetermined amount from the plurality of supplying box modules; and determining by the main body that the printing medium is loaded by equal to or less than the predetermined amount to the supplying box module corresponding to the identifying ID information among the plurality of supplying box modules if receiving the sensing signal.

BRIEF DESCRIPTION OF THE DRAWINGS

The above and/or other aspects will become apparent and more readily appreciated from the following description of the exemplary embodiments, taken in conjunction with the accompanying drawings, in which.

DETAILED DESCRIPTION

Figure 1:
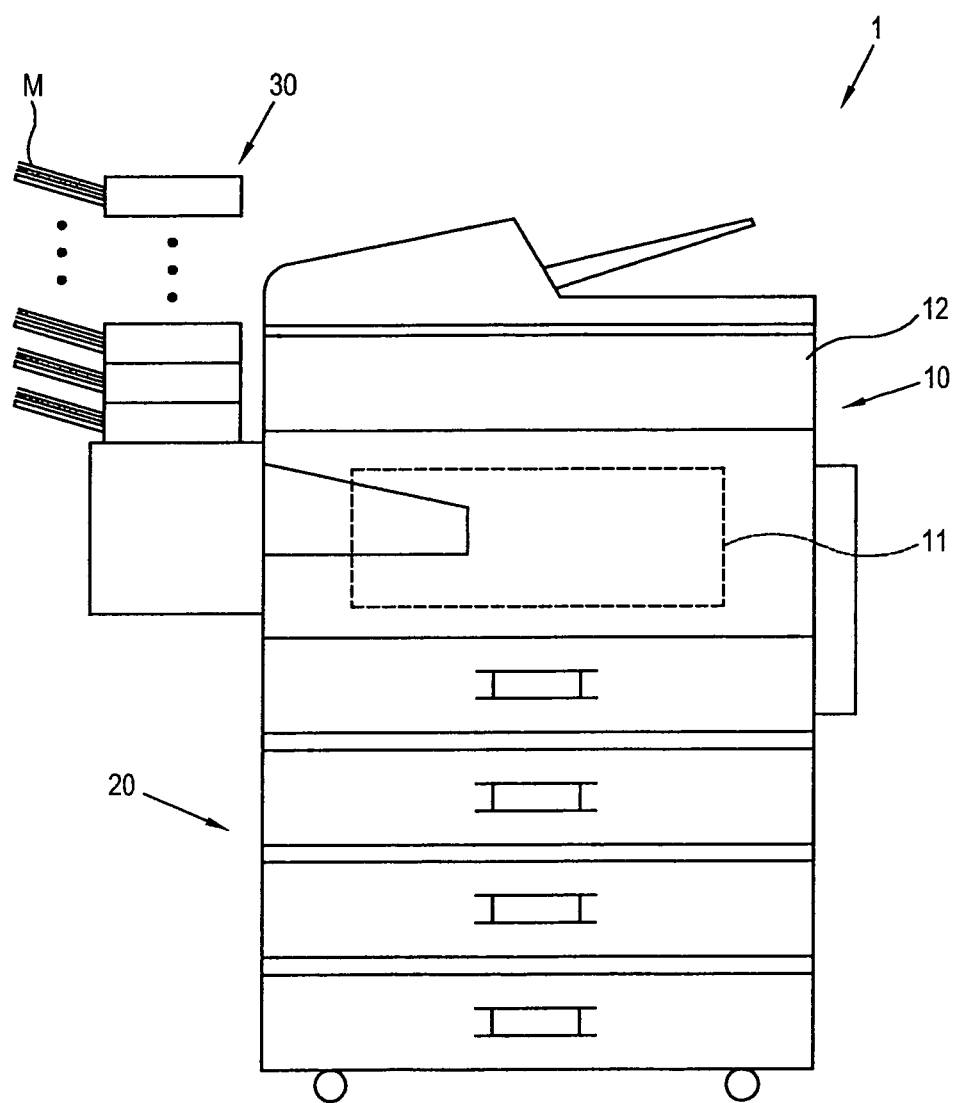
FIG. 1 exemplary illustrates an image forming apparatus according to a first exemplary embodiment.

Below, exemplary embodiments will be described in detail with reference to accompanying drawings so as to be easily realized by a person having ordinary knowledge in the art. The exemplary embodiments may be embodied in various forms without being limited to the exemplary embodiments set forth herein. Descriptions of well-known parts are omitted for clarity, and like reference numerals refer to like elements throughout.

FIG. 1 exemplary illustrates an image forming apparatus 1 according to a first exemplary embodiment.

As shown in FIG. 1, the image forming apparatus 1 according to the present exemplary embodiment is exemplarily described to be embodied by an electronic copier, but may be applied to a printer forming an image on a printing medium M, a multi function printer (MFP), etc.

The image forming apparatus 1 includes a main body 10, a supplying box module 20 disposed to a lower side of the main body 10 and supplying a printing medium M with respect to the main body 10, and a plurality of mail box modules 30 coupled to an output side of printing medium M of the main body 10 so that a printing medium M formed with an image by an image forming unit 11 can be output from the main body 10 to be loaded thereon.

The main body 10 includes the image forming unit 11 forming an image to a printing medium M. the image forming unit 11 forms a visible image on a printing medium M supplied from the supplying box module 20. The image forming unit 11 may employ a known configuration forming a black image or a color image by a developer.

The image body 10 further includes a scanner 12 scanning a predetermined document, and the image forming unit 11 may form an image of a document output from the scanner 12 on a printing medium M. Accordingly, the image forming apparatus 1 copies an image of a document to a printing medium M The main body 10 outputs a printing medium M formed with an image by the image forming unit 11 to an outside, and one or a plurality of mail box modules 30 are stacked and coupled to an outside of the main body to which a printing medium M is output.

A plurality of mail box modules 30 are stacked to have a plurality of steps, and the total number of the mail box modules 30 disposed to the main body 10 may be freely determined within a predetermined range. A user may stack a wanted number of mail box modules 30 to mount to the main body 10. A printing medium M output from the main body 10 is output and loaded on one of the mail box modules 30.

Figure 2:
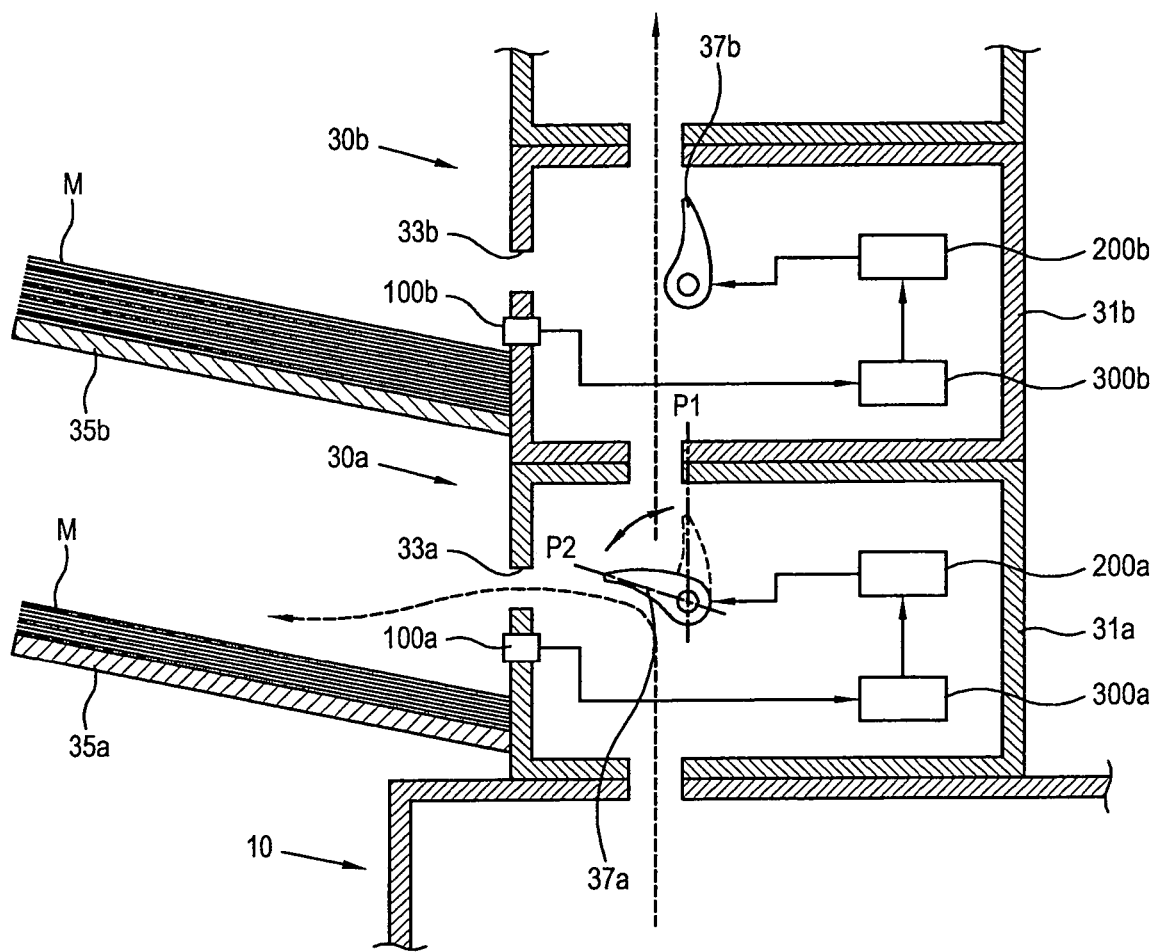
FIG. 2 is a main portion side sectional view illustrating a mail box module in the image forming apparatus in FIG. 1.

Hereinafter, the configuration of the mail box modules 30 will be described by referring to FIG. 2. FIG. 2 is a main portion side sectional view illustrating the mail box modules 30a and 30b. A dotted line illustrated in FIG. 2 refers to a transportation path of a printing medium M, and a roller configuration transporting a printing medium M is not shown to clearly illustrate the present exemplary embodiment.

As shown in FIG. 2, the mail box modules 30a and 30b are upwardly stacked in order from the main body 10. That is, a first mail box module 30a is mounted to an output side of a printing medium M in the main body 10, and a second mail box module 30b is mounted to an upper side of the first mail box module 30a, and like this, each mail box module 30a and 30b is stacked with respect to another mail box module 30a and 30b.

Each mail box module 30a and 30b includes a mail box housing 31a and 31b forming an outer appearance, an output tray 35a and 35b coupled to an outer side of the mail box housing 31a and 31b, a guide 37a and 37b rotating to selectively guide a transported printing medium M to the output tray 35a and 35b, a sensor 100a and 100b sensing whether the amount of a printing medium M loaded to the output tray 35a and 35b is equal to or more than a predetermined value or not, a driving unit 200a and 200b operating the guide 37a and 37b, and a control circuit unit 300a and 300b controlling a driving of the driving unit 200a and 200b.

The mail box housing 31a and 31b has a substantially hexahedral shape, and upper and lower surfaces thereof are flat so that stacking against another mail box housing 31a and 31g can be possible. The mail box housing 31a and 31b is disposed with a signal wiring (not shown) from the main body 10, and a terminal configuration may be disposed to an outer side for an electric connection with a signal wiring disposed to another stacked mail box housing 31a and 31b.

The mail box housing 31a and 31b is disposed along a transportation path of a printing medium M, and a side of the mail box housing 31a and 31b positioned on the transportation path of the printing medium M is formed with a hole, thereby preventing interference of a printing medium M.

The mail box housing 31a and 31b includes a discharging hole 33a and 33b formed through a side to which the output tray 35a and 35b is coupled so that a printing medium M guided by the guide 37a and 37b can be output to the output tray 35a and 35b.

The output tray 35a and 35b is coupled to a lower side of the discharging hole 33a and 33b of an outer side of the mail box housing 31a and 31b. The output tray 35a and 35b has a plate shape, and loads a printing medium M output from the discharging hole 33a and 33b on a planar surface thereof.

The guide 37a and 37b is disposed along the transportation path of the printing medium M inside the mail box housing 31a and 31b. The guide 37a and 37b rotates between a predetermined standby position P1 and a guide position P2 by a driving of the driving unit 200a and 200b. Since the guide 37a and 37b does not interfere with transportation of a printing medium M when being positioned in the standby position P1, the printing medium M is transported to another mail box housing 31a and 31b stacked in an upper side thereof. On the other hand, when being positioned in the guide position P2, the guide 37a and 37b interferes with a printing medium M to guide to be output to the discharging hole 33a and 33b.

The sensor 100a and 100b is disposed between the output tray 35a and 35b and the discharging hole 33a and 33b to an outside of the mail box housing 31a and 31b. The sensor 100a and 100b is embodied by a photo sensor, and outputs a sensing signal to the control circuit unit 300a and 300b if the amount of a printing medium M loaded to the output tray 35a and 35b reaches a height in which the sensor 100a and 100b is positioned.

The driving unit 200a and 200b rotates the guide 37a and 37b depending on a control of the control circuit unit 300a and 300b. The driving unit 200a and 200b may be embodied by various configurations such as a solenoid, a motor, etc., and according to the present exemplary embodiment, is exemplarily embodied by a solenoid.

The driving unit 200a and 200b is turned on or turned off depending on whether an active signal is received from the control circuit unit 300a and 300b or not, thereby determining the position of the guide 37a and 37b. For example, if receiving an active signal, the driving unit 200a and 200b is turned on to rotate the guide 37a and 37b to the guide position P2. On the other hand, if not receiving an active signal, the driving unit 200a and 200b is turned off to rotate the guide 37a and 37b to the standby position P1.

If the control circuit unit 300a and 300b receives an identifying ID information of the mail box module 30a and 30b from the main body 10, in detail, from a main body control unit 17, the control circuit unit 300a and 300b operates differently depending on whether the received identifying ID information corresponds to a predetermined identifying ID of the mail box module 30a and 30b itself or not. The identifying ID is separately determined by each mail box module 30a and 30b to discern each mail box module 30a and 30b.

If the control circuit unit 300a and 300b receives an identifying ID information corresponding to a predetermined identifying ID, the control circuit unit 300a and 300b outputs an active signal with respect to the driving unit 200a and 200b to drive the driving unit 200a and 200b.

On the other hand, if a received identifying ID information does not correspond to a predetermined identifying ID, the control circuit unit 300a and 300b does not output an active signal with respect to the driving unit 200a and 200b. Accordingly, the driving unit 200a and 200b does not drive, and the guide 37a and 37b maintains the standby position P1.

Here, the control circuit unit 300a and 300b of each mail box module 30a and 30b receives an identifying ID information from the main body 10, and among these, what drives the driving unit 200a and 200b is only one control circuit unit 300a and 300b of the corresponding identifying ID. Accordingly, a printing medium M output from the main body 10 can be output and loaded to the output tray 35a and 35b of the mail box module 30a and 30b of the corresponding identifying ID.

Also, the control circuit unit 300a and 300b selectively transmits a sensing signal output from the sensor 100a and 100b to the main body 10. If the control circuit unit 300a and 300b receives a sensing signal from the sensor 100a and 100b, the control circuit unit 300a and 300b outputs this sensing signal to the main body 10 if an identifying ID information received from the main body 10 corresponds to a predetermined identifying ID. On the other hand, if an identifying ID information received from the main body 10 does not correspond to a predetermined identifying ID, the control circuit unit 300a and 300b does not output this sensing signal to the main body 10.

Figure 3:
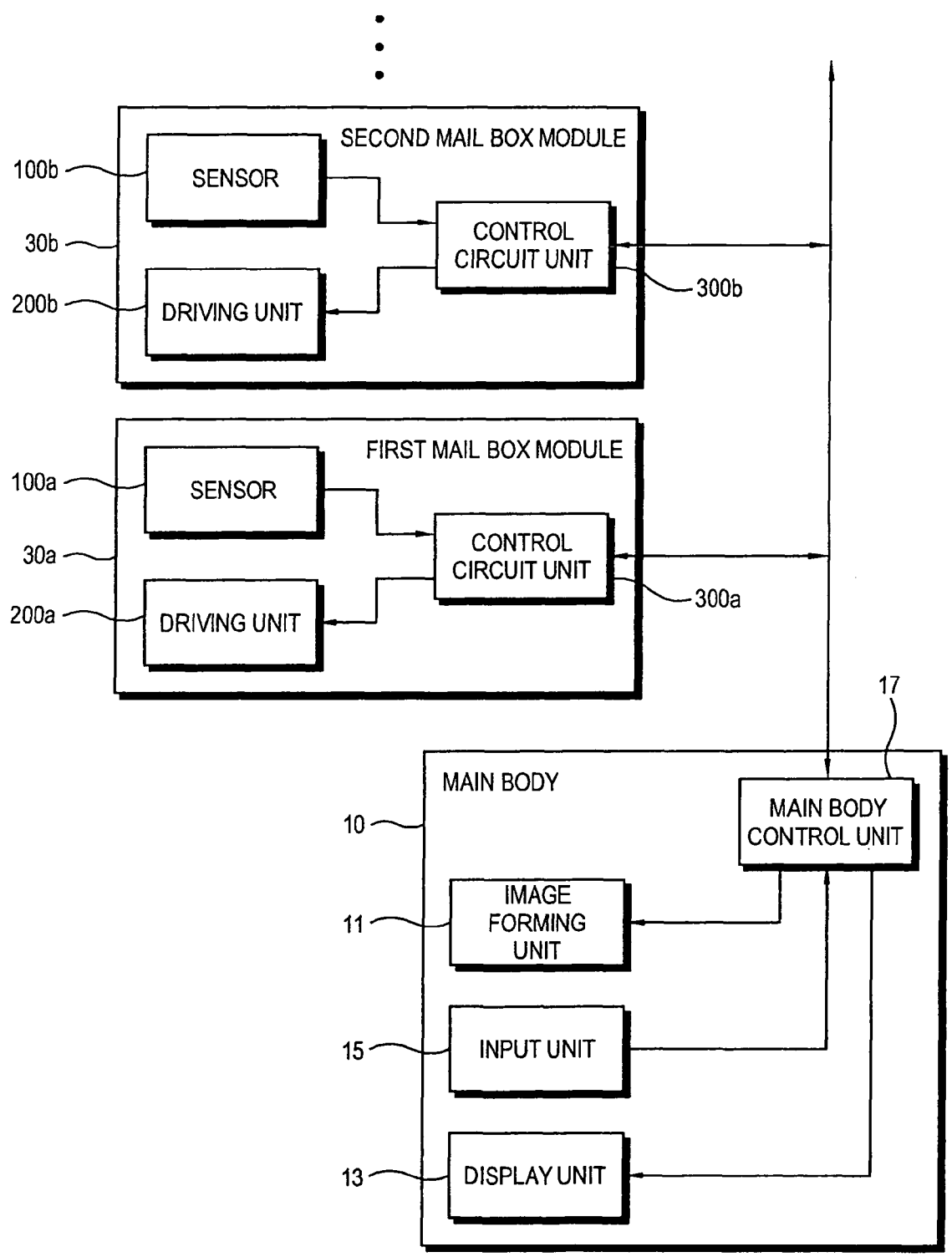
FIG. 3 is a configuration block diagram of a main body and the mail box module in the image forming apparatus in FIG. 1.

Hereinafter, control and signal transmitting relations between the main body 10 and the mail box module 30a and 30b will be described by referring to FIG. 3. FIG. 3 is a configuration block diagram of the main body 10 and the mail box module 30a and 30b.

As shown in FIG. 3, the main body 10 includes the image forming unit 11, a display unit 13 displaying various settings and operating states of the main body 10, an input unit 15 through which a predetermine input is performed depending on a manipulation of a user, and the main body control unit 17.

The display unit 13 is embodied by a liquid crystal panel disposed to an outer side of the main body 10. The display unit 13 displays various contents such as an event message related to various events of the image forming apparatus 1, a setting information when a user designates a setting of the image forming apparatus 1 through the input unit 15, etc. by the main body control unit 17.

The input unit 15 is disposed to be adjacent to the display unit 13 to an outside of the main body 10. The input unit 15 may include a mechanical key or an electrical key, or may be formed integrally with the display unit 13 embodied by a touch screen. Also, the input unit 15 may be embodied by a host (not shown) connected to the main body 10 by a local or a network.

The input unit 15 may input various predetermined commands by being manipulated by a user, and may transmit the commands input like this to the main body control unit 17 so that an operation corresponding to the commands can be performed. For example, a user may select through the input unit 15 the mail box module 30a and 30b to which a printing medium M formed with an image in the image forming unit 11 is to be output.

The main body control unit 17 controls the configuration of the main body 10 including the image forming unit 11, for example, a supplying of a printing medium M, an operation of the scanner 12, a direct current electric power supplying of various levels, etc. Additionally, the main body control unit 17 outputs an identifying ID information of the mail box module 30a and 30b to each mail box module 30a and 30b so that a printing medium M can be output to the corresponding mail box module 30a and 30b.

Also, if the main body control unit 17 receives a sensing signal from the sensor 100a and 100b when outputting an identifying ID information like this, the main body control unit 17 determines whether the amount of a printing medium M loaded in the mail box module 30a and 30b corresponding to the output identifying ID information is equal to or more than a predetermined value or not. Accordingly, the main body control unit 17 displays an error message including this contents in the display unit 13 to inform a user.

Each mail box module 30a and 30b includes the sensor 100a and 100b, the driving unit 200a and 200b and the control circuit unit 300a and 300b, and all control circuit units 300a and 300b share a signal line from the main body control unit 17. That is, if a predetermined identifying ID information is output from the main body control unit 17, this information is transmitted to all control circuit units 300a and 300b. Only one control circuit unit 300a and 300b corresponding to the received identifying ID information among the control circuit units 300a and 300b controls the driving unit 200a and 200b, and accordingly, a printing medium M can be output to the corresponding mail box module 30a and 30b.

Like this, since all mail box modules 30a and 30b share the signal line with respect to the main body control unit 17 irrespective of the number of the mail box module 30a and 30b, a signal wiring configuration between the main body 10 and the mail box module 30a and 30b is easy. Accordingly, it is easy to additionally mount and separate the mail box module 30a and 30b to and from the main body 10.

Hereinafter, the circuit configuration of the control circuit unit 300a of the first mail box module 30a in FIG. 3 will be described more in detail by referring to FIG. 4. The other mail box module 30a may employ the exemplary embodiment of the first mail box module 30a, and the detail description thereof is omitted.

Figure 4:
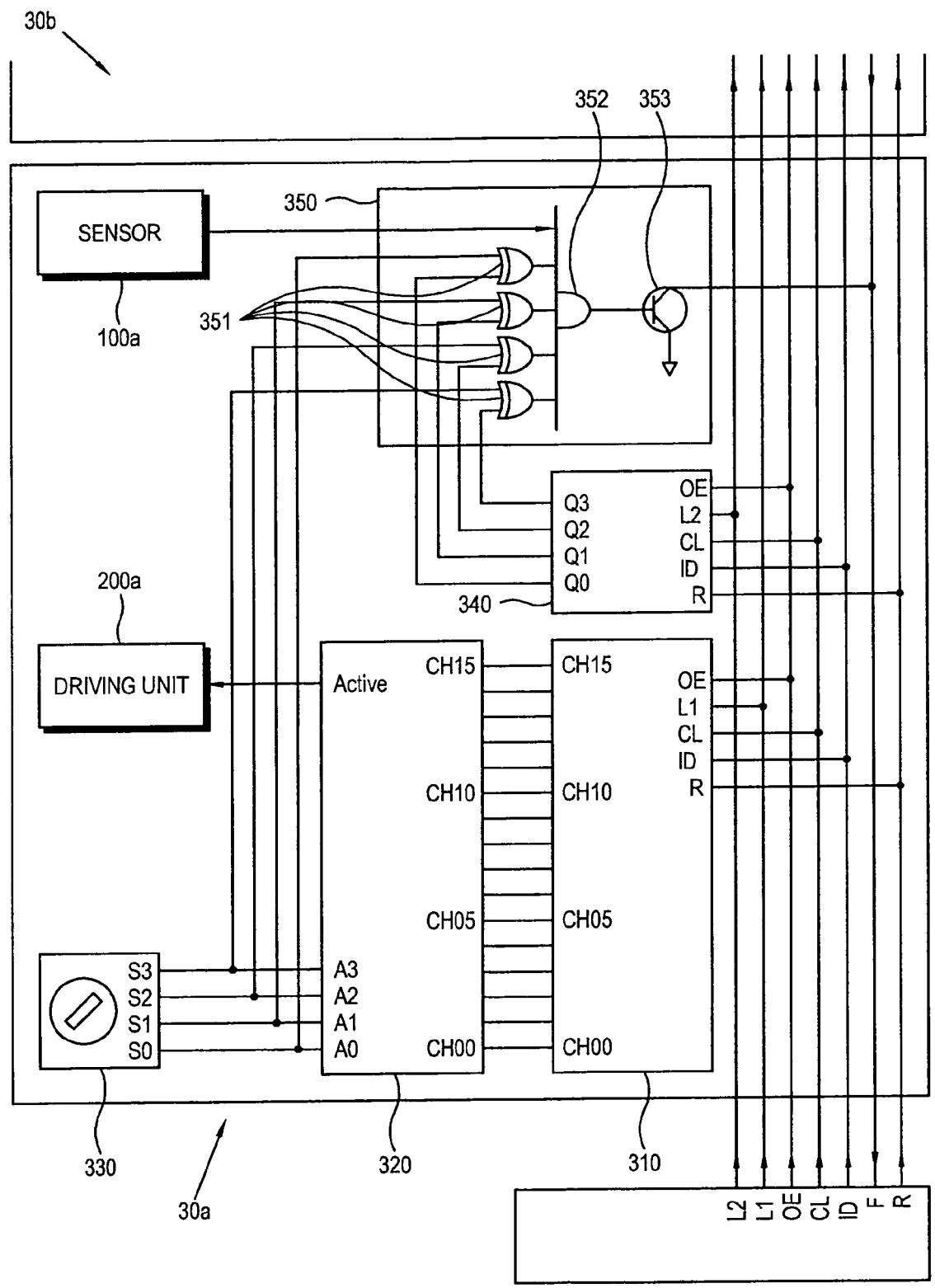
FIG. 4 is a circuit configuration diagram of a control circuit unit of a first mail box module in FIG. 3.

FIG. 4 is a schematic circuit configuration diagram of the control circuit unit 300a of the first mail box module 30a.

As shown in FIG. 4, seven signal lines are connected to the main body control unit 17. Each signal line includes L1 and L2 through which a latch signal is output, OE through which an output enable signal is output, CL through which a clock signal is output, ID through which an identifying ID information of the mail box module 30a and 30b is output, F through which a sensing signal from the sensor 100a of the mail box module 30a and 30b is input, and R through which a reset signal for resetting the control circuit unit 300a in a malfunction of the control circuit unit 300a is output.

The signal lines L1, L3, OE, CL, ID and R transmit a signal output from the main body control unit 17, and the signal line F transmits a signal input to the main body control unit 17. Each signal will be described together with each configuration of the control circuit unit 300a.

The control circuit unit 300a includes a first shift register 310 receiving an identifying ID information from the main body control unit 17, a multiplexer 320 forming a plurality of channels between the first shift register 310 to selectively output an active signal with respect to the driving unit 200a, and an ID setting unit 330 setting an inherent identifying ID of the first mail box module 30a. By this configuration, the control circuit unit 300a can enable a selective driving control of the driving unit 200a.

Also, the control circuit unit 300a further includes a second shift register 340 receiving an identifying ID information from the main body control unit 17, and a comparing unit 350 comparing the identifying ID information from the second shift register 340 and an identifying ID set in the ID setting unit 330 to selectively transmit a sensing signal from the sensor 100a to the main body control unit 17. By this configuration, the control circuit unit 300a can inform the main body control unit 17 that a printing medium M is currently loaded on the first mail box module 30a by equal to or more than a predetermined value.

The first shift register 310 is embodied by a shift register element. In the shift register, a plurality of flip flops are configured by a cascade type in an inner part thereof, and a serial data is input initially to a data input terminal, and then, all bits move by one cipher in every clock period.

L1, OE, CL, ID and R are input to the first shift register 310 from the main body control unit 17. Here, all first shift registers 310 of each mail box module 30 respectively share the signal lines of L1, OE, CL, ID and R. For example, the first shift register 310 of all mail box modules 30 is connected to the signal line of the same ID. This means that if an identifying ID information is output through the signal line of ID from the main body control unit 17, this output information is equally input to the first shift register 310 of all mail box module 30.

The first shift register 310 has a plurality of output channels. The number of the output channel corresponds to the total number of the mail box modules 30 mounted to the main body 10. For example, if sixteen mail box modules 30 are totally mounted to the main body 10, the number of the output channels of the first shift register 310 is sixteen to correspond to each mail box module 30.

According to the present exemplary embodiment, the first shift register 310 totally has sixteen channels of CH00 to CH15. Each channel corresponds to an identifying ID information from the main body control unit 17.

The first shift register 310 respectively receives an identifying ID information, a clock signal, a latch signal and an output enable signal through the signal lines of ID, CL, L1 and OE. The first shift register 310 operates based on the clock signal and the latch signal, and turns on a channel corresponding to the identifying ID information among the plurality of output channels. Since a turning on timing of this channel follows the output enable signal, the main body control unit 17 outputs the output enable signal in an appropriate timing depending on a current position.

The multiplexer 320 forms the channels of CH00 to CH15 between the first shift register 310. Also, the multiplexer 320 has four bit input channels of A0 to A3, and these channels are turned on or turned off by the ID setting unit 330.

The channels A0 to A3 of the multiplexer 320 are respectively turned on or turned off so that four bits from binary numbers [0,0,0,0] to [1,1,1,1], that is, totally sixteen cases respectively corresponding to the channels of CH00 to CH15 can be available. A previously determined identifying ID of the first mail box module 30a can be represented from these channel states of A0 to A3. That is, by the channel states of A0 to A3, an identifying ID can be set to the multiplexer 320.

If one channel among the channels of CH00 to CH15 is turned on by the first shift register 310, the multiplexer 320 selectively outputs an active signal depending on whether this turned on channel corresponds to the predetermine identifying ID or not. The multiplexer 320 outputs an active signal if the turned on channel corresponds to the predetermined identifying ID, and does not output the active signal if the turned on channel does not correspond to the predetermined identifying ID.

The ID setting unit 330 sets an identifying ID of the first mail box module 30a. The ID setting unit 330 may be embodied by a sum wheel switch which a user can manipulate. When the mail box module 30 is initially mounted to the main body 10, a user manipulates the ID setting unit 330 to designate an identifying ID of the corresponding mail box module 30.

The ID setting unit 330 may set an ID of totally sixteen cases depending on a four bit output of the channels S0 to S3 by a binary number. The channels S0 to S3 set like this respectively correspond to the channels A0 to A3 of the multiplexer 320, and four primary logic gates 351 of the comparing unit 350.

The second shift register 340 is embodied by a shift register element. The second shift register 340 is connected to the signal lines of L2, OE, CL, ID and R. The second shift register 340 shares the signal lines of OE, CL, ID and R with the first shift register 310. However, since the second shift register 340 is a separate configuration from the first shift register 310, a latch signal uses a separate signal line L2 from the signal line L1. The second shift registers 340 of all mail box modules 30 share the signal line L2.

The second shift register 340 has a four bit output channel of Q0 to Q3, and this corresponds to sixteen which is the total case number of an identifying ID. The second shift register 340 corresponds to an identifying ID information input from the main body control unit 17 to selectively turn on or turn off the channels Q0 to Q3.

The comparing unit 350 includes a plurality of primary logic gates 351 comparing the channels S0 to S3 of the ID setting unit 330 and the channels Q0 to Q3 of the second shift register 340 one to one, a secondary logic gate 352 selectively outputting a sensing signal of the sensor 100a based on an output result of the primary logic gate 351, and a transistor 353 configuring an open collector output with respect to an F signal line.

The primary logic gate 351 is configured by four gates respectively separately comparing S0 and Q0, S1 and Q1, S2 and Q2, and S3 and Q3. The primary logic gate 351 outputs 0 if two input values of comparison targets are the same, and outputs 1 if different.

The secondary logic gate 352 outputs a sensing signal from the sensor 100a if the result of the four primary logic gates 351 is [0,0,0,0], that is, if an identifying ID information from the main body control unit 17 corresponds to a predetermined identifying ID. On the other hand, the secondary logic gate 352 does not output a sensing signal from the sensor 100a if the result of the four primary logic gates 351 includes at least one 1, that is, if an identifying ID information from the main body control unit 17 does not correspond to a predetermined identifying ID.

The transistor 353 is disposed to an output terminal of the secondary logic gate 352. The transistor 353 disposed to all mail box modules 30 is connected to the signal line F by the open collector output so that the comparing unit 350 of all mail box modules 30 can share the signal line F.

An inner circuit operating process of the first mail box module 30a by the above configuration will be described. Here, it is exemplarily illustrated that an inherent identifying ID of the first mail box module 30a is set to be number 01 among totally sixteen numbers of 01 to 16, and a binary number [0,0,0,0] by the ID setting unit 330.

First, the case that the an identifying ID information from the main body control unit 17 corresponds to a predetermined identifying ID, and a printing medium of the output tray 35a and 35b is less than a predetermined amount so that the sensor 100a does not output a sensing signal is considered.

The main body control unit 17 outputs an identifying ID information of the number 01 through the signal line ID. The first shift register 310 turns on the channel CH00 corresponding to the identifying ID of the number 01 from the information input from the signal line ID.

Since the channels A0 to A3 of the multiplexer 320 are set to be [0,0,0,0] corresponding to the identifying ID of the number 01 by the ID setting unit 330, the turned on channel CH00 corresponds to the previously determined identifying ID of the number 01. Accordingly, the multiplexer 320 outputs an active signal with respect to the driving unit 200a.

Also, the second shift register 340 sets the channels Q0 to Q3 to be [0,0,0,0] to correspond to the identifying ID information of the number 01 input from the main body control unit 17.

The four primary logic gates 351 respectively form pairs of input values of [0,0], [0,0], [0,0] and [0,0] from the ID setting unit 330 and the second shift register 340. Since the two input values forming each input value pair are the same, a value input to the secondary logic gate 352 from the primary logic gate 351 represents [0,0,0,0].

Since all of the values input from the primary logic gate 351 represent 0, if a sensing signal is transmitted from the sensor 100a, the secondary logic gate 352 can output this. However, since the sensing signal is not transmitted from the sensor 100a, consequently, the sensing signal from the comparing unit 350 is not output.

Second, the case that the an identifying ID information from the main body control unit 17 corresponds to a predetermined identifying ID, and a printing medium of the output tray 35a and 35b is more than a predetermined amount so that the sensor 100a outputs a sensing signal is considered.

The main body control unit 17 outputs an identifying ID information of the number 01 through the signal line ID. The first shift register 310 turns on the channel CH00 corresponding to the identifying ID of the number 01 from the information input from the signal line ID.

Since the turned on channel CH00 corresponds to the previously determined identifying ID of the number 01, the multiplexer 320 outputs an active signal with respect to the driving unit 200a.

Also, the second shift register 340 sets the channels Q0 to Q3 to be [0,0,0,0] to correspond to the identifying ID information of the number 01 input from the main body control unit 17.

The four primary logic gates 351 respectively form pairs of input values of [0,0], [0,0], [0,0] and [0,0] from the ID setting unit 330 and the second shift register 340. Since the two input values forming each input value pair are the same, a value input to the secondary logic gate 352 from the primary logic gate 351 represents [0,0,0,0].

Since all the values input from the primary logic gate 351 represent 0, the secondary logic gate 352 allows a sensing signal from the sensor 100a to be output. The output sensing signal is transmitted to the main body control unit 17 through signal line F.

Since the sensing signal is received when outputting the identifying ID information of the number 01, the main body control unit 17 can determine that the loaded amount of a printing medium of the first mail box module 30a corresponding to the identifying ID of the number 01 is more than a predetermined value. Accordingly, the main body control unit 17 displays an error message in the display unit 13.

Third, the case that an identifying ID information from the main body control unit 17 does not correspond to a predetermined identifying ID.

The main body control unit 17 outputs an identifying ID information different from the number 01, for example, number 02 through the signal line ID. The first shift register 310 turns on the channel CH01 corresponding to the identifying ID of the number 02 from the information input from the signal line ID.

Since the turned on channel CH01 does not correspond to the previously determined identifying ID of the number 01, the multiplexer 320 does not output an active signal with respect to the driving unit 200a.

Also, the second shift register 340 sets the channels Q0 to Q3 to be [0,0,0,1] to correspond to the identifying ID information of the number 02 input from the main body control unit 17.

The four primary logic gates 351 respectively form pairs of input values of [0,0], [0,0], [0,0] and [0,1] from the ID setting unit 330 and the second shift register 340. Based on these input value pairs, a value input to the secondary logic gate 352 from the primary logic gate 351 represents [0,0,0,1].

Since the values input from the primary logic gate 351 includes at least one 1, although a sensing signal is transmitted from the sensor 100a, the secondary logic gate 352 does not output this.

As described above, according to the present exemplary embodiment, by applying to the control circuit unit 300a of the mail box module 30 the shift register 310 and the multiplexer 320 instead of a microprocessor, the driving unit 320 can be selectively driven to correspond to an identifying ID information output from the main body control unit 17.

In the above exemplary embodiment, only the single driving unit 200a is exemplary described to be disposed to the single mail box module 30, but the present exemplary embodiment is not defined thereto.

For example, in case of concurrently driving two driving units 200a in the single mail box module 30, the multiplexer 320 may respectively output an active signal to the two driving units 200a.

Also, the configuration of the first shift register 310 and the multiplexer 320 corresponding to another driving unit 200a may be added. In this case, the two first shift registers 310 share the signal lines OE, CL, ID and R, but do not share the signal line L1. That is, the added first shift register 310 has a separate signal line for receiving a latch signal.

The sensor 100a may be also disposed to the single mail box module 30 in plural. In this case, the second shift register 340 and the comparing unit 350 corresponding to the added sensor 100a are added. A plurality of second shift registers 340 in the single mail box module 30 share the signal lines OE, CL, ID and R except L2, and the signal line for a latch signal is separately provided. Also, the added comparing unit 350 does not share the signal line F, and respectively has a separate signal line.

The exemplary embodiment described above is related to the mail box module 30, but is not defined thereto. Hereinafter, a second exemplary embodiment applying the configuration described above to supplying box modules 20a, 20b and 20c will be described by referring to FIG. 5.

Figure 5:
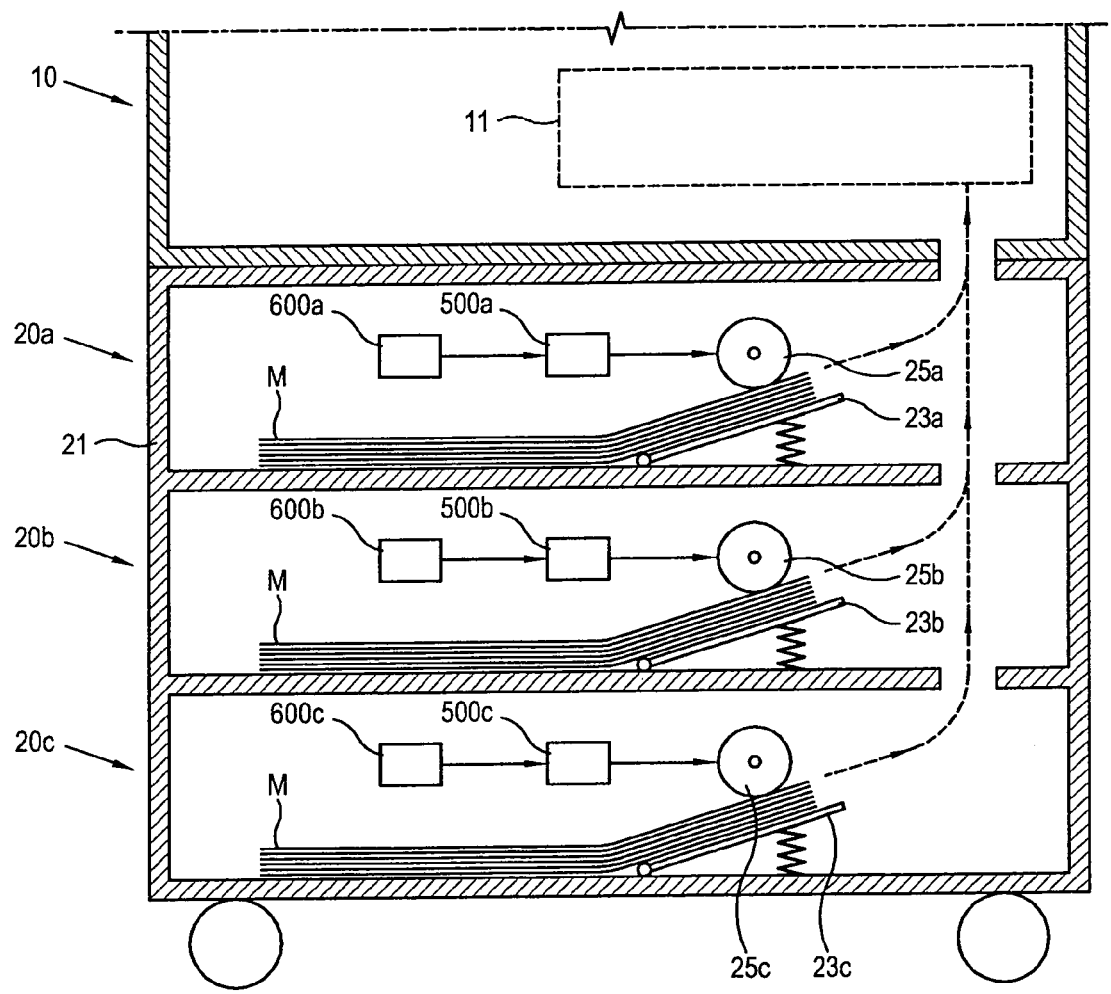
FIG. 5 is a main portion side sectional view illustrating a supplying box module according to a second exemplary embodiment.

FIG. 5 is a main portion side sectional view illustrating the supplying box module 20a, 20b and 20c. A dotted lien illustrated in FIG. 5 is a transportation path of a printing medium M, and a roller configuration transporting the printing medium M is not shown to clearly illustrate the present exemplary embodiment.

As shown in FIG. 5, a plurality of supplying box modules 20a, 20b and 20c according to the second exemplary embodiment are stacked to a lower side of a main body 10. Each supplying box module 20a, 20b and 20c includes a supplying box housing 21, a loading plate 23a, 23b and 23c disposed inside the supplying box housing 21 and loaded with a printing medium M for supplying to the main body 10, a pickup roller 25a, 25b and 25c picking up the printing medium M on the loading plate 23a, 23b and 23c to supply to the main body 10, a driving unit 500a, 500b and 500c driving the pickup roller 25a, 25b and 25c, and a control circuit unit 600a, 600b and 600c selectively controlling driving of the driving unit 500a, 500b and 500c.

If a printing work is started, a printing medium M is picked up from one selected among each supplying box module 20a, 20b and 20c to be supplied to the main body 10. The supplied printing medium M is formed with an image by an image forming unit 11 of the main body 10. Since a printing medium supplied to the main body 10 is one sheet in a one time printing work, the supplying box module 20a, 20b and 20c to supplying the printing medium M should be selected among the plurality of supplying box modules 20a, 20b and 20c. This selection is performed by transmitting an identifying ID information of the supplying box module 20a, 20b and 20c with respect to each control circuit unit 600a, 600b and 600c from the main body 10.

Figure 6:
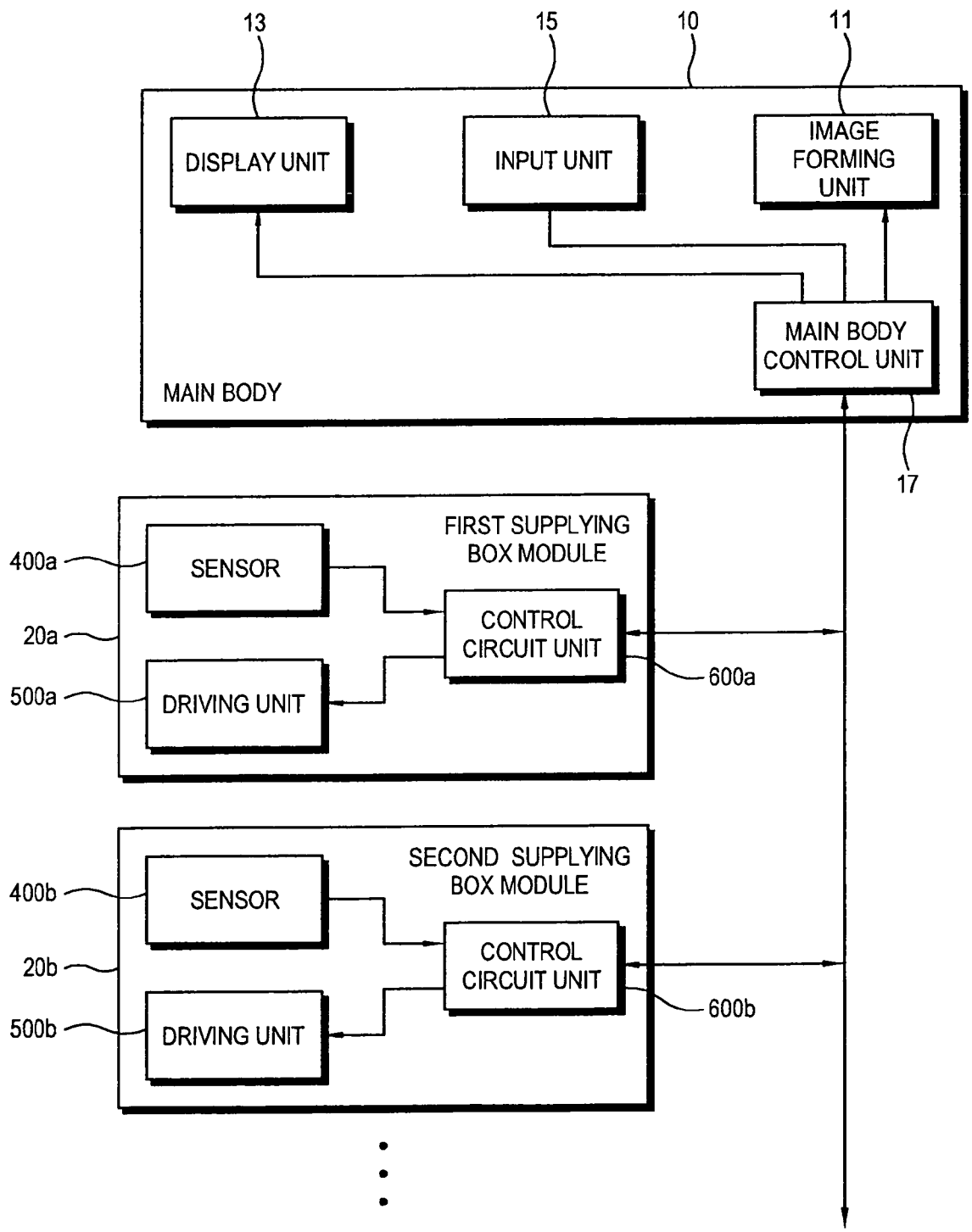
FIG. 6 is a configuration block diagram of a main body and the supplying box module in an image forming apparatus in FIG. 5.

FIG. 6 is a configuration block diagram of the main body 10 and the supplying box module 20a, 20b and 20c.

As shown in FIG. 6, the main body 10 includes the image forming unit 11, an input unit 15, a display unit 13 and a main body control unit 17. Each configuration of the main body 10 may be the substantially same as the first exemplary embodiment.

An inherent identifying ID is previously set to each supplying box module 20a, 20b and 20c. The supplying box module 20a, 20b and 20c includes a sensor 400a, 400b and 400c generating a sensing signal if the amount of a printing medium M loaded to the loading plate 23a, 23b and 23c is less than a predetermined amount, the driving unit 500a, 500b and 500c driving the pickup roller 25a, 25b and 25c, and the control circuit unit 600a, 600b and 600c.

The configuration of the sensor 400a, 400b and 400c is not defined. For example, the sensor 400a, 400b and 400c may be embodied by an piezoelectric element disposed on the loading plate 23a, 23b and 23c to sense the weight of a printing medium M loaded on the loading plate 23a, 23b and 23c, or may be embodied by a photo sensor to sense the loading plate 23a, 23b and 23c, the height of which varies depending on the loaded amount of a printing medium M. Also, other various configurations may be applied thereto.

The configuration of the driving unit 500a, 500b and 500c is not defined. For example, if the pickup roller 25a, 25b and 25c receives a driving force from a driving source (not shown) of the main body 10, the driving unit 500a, 500b and 500c may be embodied by a clutch regulating the transmission of the driving force. That is, if receiving an active signal from the control circuit unit 600a, 600b and 600c, the driving unit 500a, 500b and 500c may allow the driving force transmission to operate the pickup roller 25a, 25b and 25c. Also, if not receiving an active signal from the control circuit unit 600a, 600b and 600c, the driving unit 500a, 500b and 500c may block the driving force transmission to stop the pickup roller 25a, 25b and 25c.

In a printing work, a user may select one of the plurality of supplying box modules 20a, 20b and 20c through the input unit 15. the main body control unit 17 outputs an identifying ID information of the supplying box module 20a, 20b and 20c selected by the input unit 15 to each supplying box module 20a, 20b and 20c sharing a signal line.

Among each supplying box module 20a, 20b and 20c, only the control circuit unit 600a, 600b and 600c of the supplying box module 20a, 20b and 20c corresponding to the identifying ID information received from the main body 17 operates the driving unit 500a, 500b and 500c. Accordingly, the pickup roller 25a, 25b and 25c of the corresponding supplying box module 20a, 20b and 20c picks up a printing medium M to supply to the main body 10.

If the amount of a printing medium M loaded on the corresponding supplying box module 20a, 20b and 20c is less than a predetermined value, or if a printing medium M is not loaded thereon, the control circuit unit 600a, 600b and 600c transmits a sensing signal from the sensor 400a, 400b and 400c to the main body control unit 17.

If the main body control unit 17 receives this sensing signal when outputting a predetermined identifying ID information, the main body control unit 17 determines that the amount of the printing medium M loaded on the supplying box module 20a, 20b and 20c of the corresponding identifying ID is less than the predetermined value. Accordingly, the main body control unit 17 displays an error message in the display unit 13.

The detail configuration of the control circuit unit 600a, 600b and 600c according to the second exemplary embodiment may be the substantially same as the control circuit unit 300a and 300b of the first exemplary embodiment.

Like this, the present exemplary embodiment is related to an option box module such as the mail box module 30 or the supplying box module 20a, 20b and 20c disposed to input and output sides of the main body 10 by a plurality of steps, and performing an input and an output of the printing medium M with respect to the main body 10 by each disposed step. In configuring a control circuit unit of this option box module, by applying the configurations of a shift register and a multiplexer, a selective control of each option box module can be available.

Figure 7:
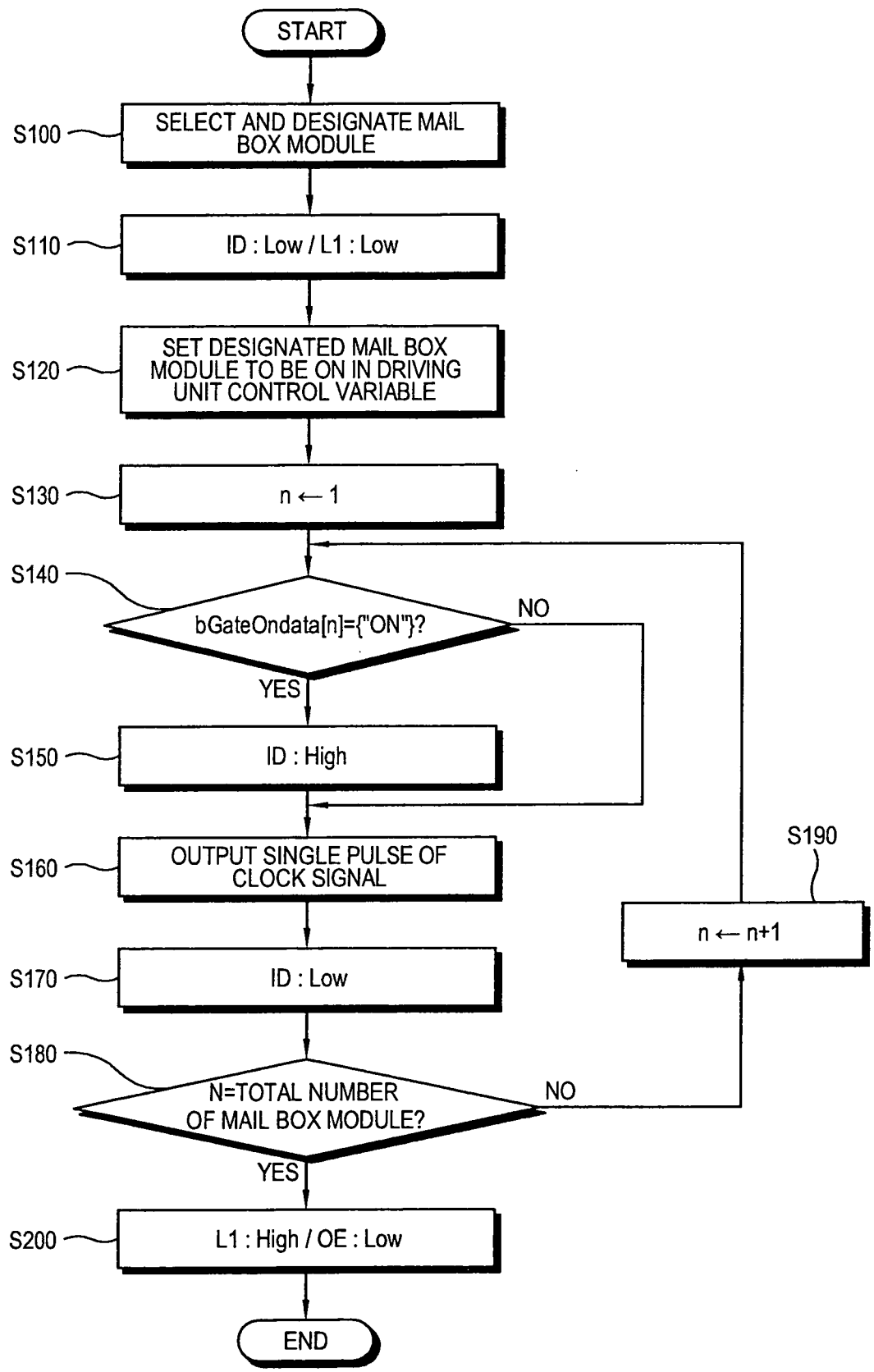
FIG. 7 is a control flowchart illustrating a control process of a main body control unit for outputting a printing medium to the mail box module in the image forming apparatus according to the first exemplary embodiment.

Hereinafter, a control process of the main body control unit 17 for outputting a printing medium M to the mail box module 30a and 30b in the image forming apparatus 1 according to the first exemplary embodiment will be described by referring to FIG. 7. FIG. 7 is a control flowchart illustrating this process. A signal wiring configuration between the main body control unit 17 and the control circuit unit 300a and 300b and the configuration of the control circuit unit 300a and 300b may be the substantially same as in FIG. 4.

Also, when each signal line is set to be a low or a high by the main body control unit 17, the signal line may be set to be active when being a low, or may be set to be active when being a high depending on a design type of the image forming apparatus 1. Accordingly, that being active when a signal line is a low or being active when a signal line is a high is just an exemplary embodiment.

As shown in FIG. 7, the mail box module 30a and 30b to output a printing medium M is selected and designated through the input unit 15 (S100). In this time, the signal lines ID and L1 are a low state (S110), and the main body control unit 17 sets the designated mail box module 30a and 30b to be on in a driving unit control variable provided to correspond to the total number of the mail box module 30a and 30b (S120).

If the driving unit control variable is bGatenOnData[i], the total number of the mail box module 30a and 30b, i is 16 (that is, i=16), and the designated mail box module 30a is the first, the driving unit control variable may be set as described below.

bGateOnData[16]={"ON","OFF","OFF","OFF","OFF", "OFF","OFF","OFF","OFF","OFF","OFF", "OFF", "OFF","OFF","OFF","OFF"}

The main body control unit 17 controls the signal line ID based on a state designated in the driving unit control variable in order of each mail box module 30a and 30b (S130 to S190). Here, the main body control unit 17 outputs a single pulse of a clock signal through the signal line CL in a once ID signal line control.

For example, if the mail box modules 30a and 30b are totally 16, the main body control unit 17 controls the signal line ID to correspond to clock signal outputs of totally 16 times.

If the driving unit control variable corresponding to the nth mail box module 30a and 30b is an on state (S140), the main body control unit 17 makes the signal line ID be a high state (S150), and outputs a single pulse of the clock signal (S160). Then, the signal line ID becomes a low state again to prepare for the n+1th mail box module 30a and 30b (S170).

If bGateOnData[n], the driving unit control variable corresponding to the nth mail box module 30a and 30b is an off state in the operation (S140), the main body control unit 17 maintains the signal line ID to be the low state, and outputs a signal pulse of the clock signal (S160). Then, n is determined to be the same as the total number of the mail box module 30a and 30b (S180), and 1 is added to n and it returns to the operation S140 if not the same (S190).

If n is the same as the total number of the mail box module 30a and 30b and execution of the driving unit control variable with respect to all mail box module 30a and 30b is ended, the latch signal is output with L1 being the high state, and an output enable signal is output with OE being the low state (S200). Accordingly, the driving unit 200a of the designated mail box module 30a and 30b operates to guide a printing medium M.

In the above exemplary embodiment, the initial value of n is exemplarily illustrated to be 1 in the operation S130, but this may be variously changed depending on the designing type. If the initial value of n is designated to be 0 in the operation S130, the main body control unit 17 may determine that the execution of the driving unit control variable with respect to all mail box module 30a and 30b is ended if n is the number smaller than the total number of the mail box module 30a and 30b by 1 in the operation 180.

Figure 8:
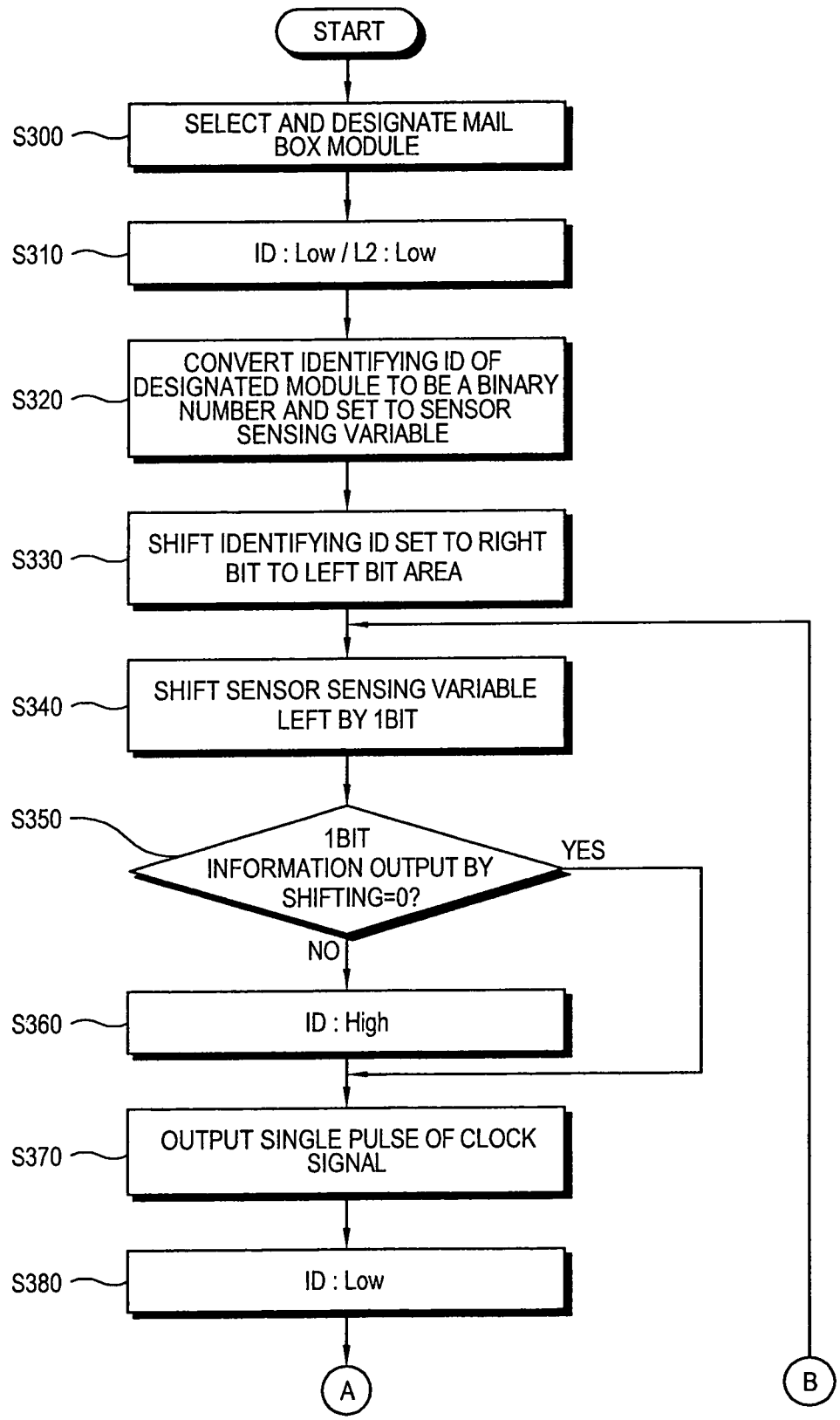
FIGS. 8 and 9 are control flowcharts illustrating a control process of the main body control unit for determining whether a printing medium is loaded to the mail box module by more than a predetermined amount or not in the image forming apparatus according to the first exemplary embodiment.
Figure 9:
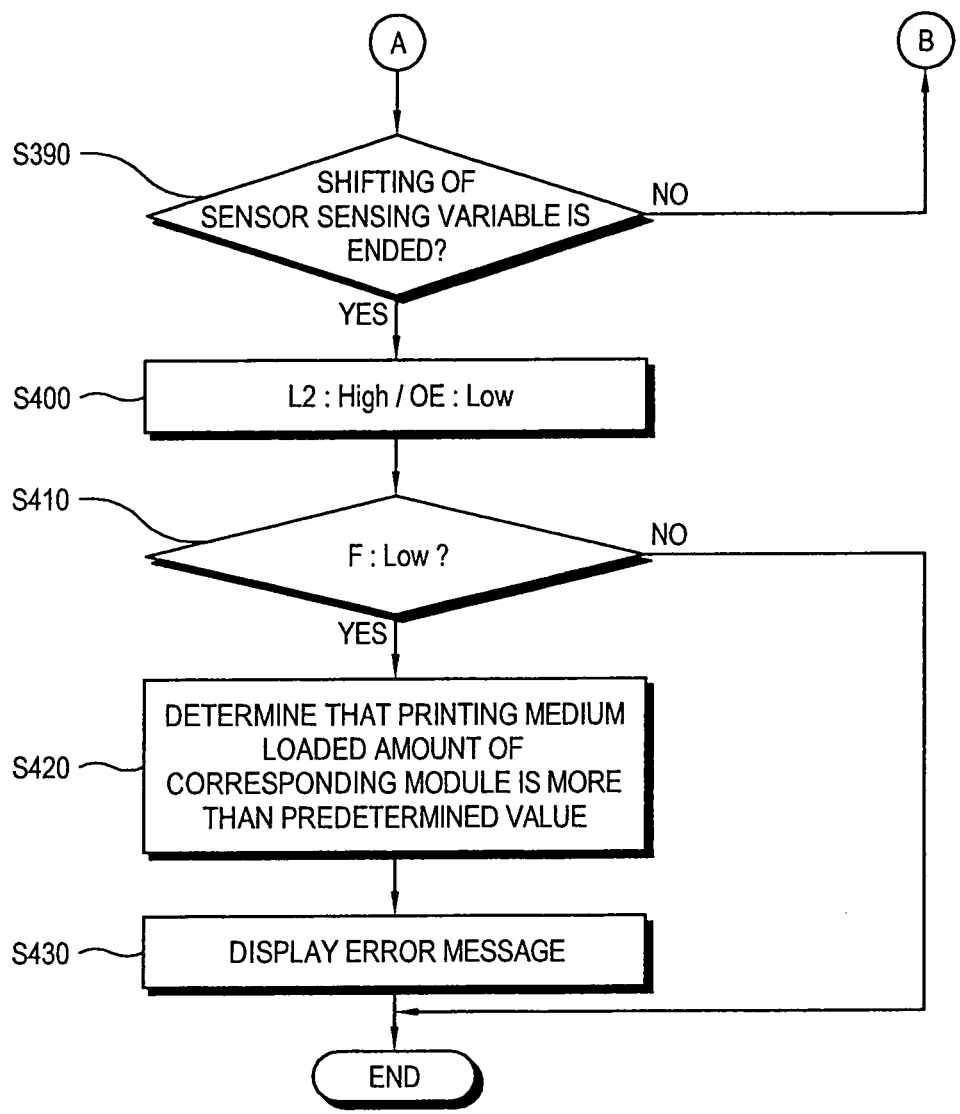

Hereinafter, a control process of the main body control unit 17 for determining whether a printing medium M is loaded by a predetermined amount on the predetermined mail box module 30a and 30b or not in the image forming apparatus 1 according to the first exemplary embodiment will be described by referring to FIGS. 8 and 9. FIGS. 8 and 9 are control flowcharts illustrating the control process.

As shown in FIGS. 8 and 9, the mail box module 30a and 30b wanted to sense the loaded amount of a printing medium M is selected and designated through the input unit 15 (S300). In this time, the signal lines ID and L2 are the low state (S310), and the main body control unit 17 converts an identifying ID corresponding to the designated mail box module 30a and 30b to be a binary number, and sets to a sensor sensing variable provided to correspond to the sensor 100a of each mail box module 30a and 30b (S320).

Since the sensor sensing variable is bFullSensorNo, and the total number of the mail box module 30a and 30b is 16, which is changed to be 4 bit, a binary number, the sensor sensing variable may be set as follows if the first mail box module 30a and 30b is designated.

bFullSensorNo=00000001 [2]

Since the identifying ID of the mail box module 30a and 30b is set to a lower 4 bit area in the above sensor sensing variable, the main body control unit 17 shifts a lower 4 bit information of the sensor sensing variable to an upper 4 bit area, or shifts a right 4 bit information to a left 4 bit area (S330). The shifted sensor sensing variable is as follows.

bFullSensorNo=00010000[2]

In this state, the main body control unit 17 shifts the sensor sensing variable by 1 bit to the left to output information of the first left 1 bit (S340), and confirms whether information of the output 1 bit is 0 or not (S350). If the output information is not 0, the main body control unit 17 makes the signal line be the high state (S360). Also, after outputting a signal pulse of the clock signal (S370), the main body control unit 17 makes the signal line ID be the low state (S380). On the other hand, if the output information is 0, the main body control unit 17 maintains the signal line ID to be the low state, and outputs a signal pulse of the clock signal (S370).

Like this, if execution of the sensor sensing variable with respect to all mail box module 30a and 30b is ended (S390), the latch signal is output with L2 being the high state, and an output enable signal is output with OE being the low state (S400).

After ending this process, the main body control unit 17 confirms the state of the signal line F (S410). If the signal line F is the low state, the main body control unit 17 may determine that the printing medium loaded amount of the corresponding mail box module 30a and 30b is more than a predetermine value (S420), and may display an error message (S430). On the other hand, if the signal line F is the high state, the main body control unit 17 determines that the printing medium loaded amount of the corresponding mail box module 30a and 30b is less than a predetermined value.

Accordingly, whether the printing medium loaded amount of the designated mail box module 30a and 30b is more than a predetermined value or not can be determined.

According to the present exemplary embodiments, by applying a shift register and a multiplexer instead of a microprocessor with respect to a control circuit unit controlling a driving unit of a mail box module, cost of a mail box module can be reduced.

Also, by applying the above configuration of the control circuit unit to a supplying box module, a printing medium can be selectively supplied to a main body from one of a plurality of supplying box modules on which a printing medium is respectively loaded.

Also, all mail box modules applied to an image forming apparatus share a signal line with respect to a main body control unit so that a wiring can be simplified and the mail box module can be easily expanded.

Also, by configuring a hardware configuration of a control circuit unit to be the same by each mail box module, a manufacturing efficiency can be improved, and a component cost can be reduced.

Also, by applying the configurations of a shift register and a comparing unit, whether a printing medium is loaded by more than a predetermined amount on a mail box module corresponding to an identifying ID transmitted from a main body control unit or not can be sensed, and this can be informed to a user.

Also, by connecting each other an output of a comparing unit of each mail box module by an open collector output, whether a printing medium is loaded by more than a predetermined amount on one of each mail box mail or not can be sensed through a single signal line. Accordingly, a wiring configuration can be simplified.

Although a few exemplary embodiments have been shown and described, it will be appreciated by those skilled in the art that changes may be made in these exemplary embodiments without departing from the principles and spirit of the invention, the scope of which is defined in the appended claims and their equivalents.

What is claimed is:

1. An image forming apparatus, comprising:
a main body which comprises an image forming unit forming an image to a printing medium; and
a plurality of mail box modules which are disposed to an output side of the printing medium in the main body to have a plurality of steps, and respectively comprise a driving unit driving so that the printing medium can be selectively output from the main body, and a control circuit unit controlling a driving of the driving unit,
the control circuit unit of each of the mail box modules comprising:
a shift register which comprises channels corresponding to the total number of the plurality of mail box modules, and, if receiving an identifying ID information of the mail box module from the main body, turns on one channel of the channels corresponding to the identifying ID information; and
a multiplexer which outputs an active signal driving the driving unit to the driving unit if the channel turned on by the shift register corresponds to a predetermined identifying ID,
wherein the respective control circuit units of the mail box modules share a signal line.

2. The image forming apparatus according to claim 1, wherein the signal line receives the identifying ID information from the main body.

3. The image forming apparatus according to claim 1, wherein the control circuit unit further comprises an ID setting unit which sets the identifying ID.

4. The image forming apparatus according to claim 1, wherein the one mail box module comprises
an output tray on which the printing medium is loaded; and
a sensor which outputs a sensing signal to the control circuit unit if the printing medium is loaded on the output tray by equal to or more than a predetermined amount, and
the control circuit unit outputs the sensing signal to the main body if the identifying ID information received from the main body corresponds to the predetermined identifying ID when receiving the sensing signal.

5. The image forming apparatus according to claim 4, wherein the control circuit unit further comprises:
a second shift register which comprises a plurality of channels, and selectively turns on the channels to correspond to the identifying ID information received from the main body; and
a comparing unit which compares whether a turned on state of the plurality of channels of the second shift register corresponds to the predetermined identifying ID or not, and selectively outputs the sensing signal from the sensor depending on a comparison result.

6. The image forming apparatus according to claim 5, wherein the comparing units of the respective mail box modules are connected mutually by an open collector output to share the signal line outputting the sensing signal to the main body.

7. The image forming apparatus according to claim 4, wherein the main body further comprises a main body control unit which outputs the identifying ID of one mail box module to the plurality of mail box modules so that the printing medium formed with an image can be output to the one mail box module of the plurality of mail box modules.

8. The image forming apparatus according to claim 7, wherein the main body control unit determines that a printing medium loaded amount of the mail box module corresponding to the output identifying ID is equal to or more than a predetermined amount to display an error message in a display unit of the main body if receiving the sensing signal from the plurality of mail box modules.

9. The image forming apparatus according to claim 1, wherein one of the mail box modules comprises:
an output tray on which the printing medium is loaded; and
a guide which is moved by the driving unit to selectively guide the printing medium output from the main body to the output tray.

10. An image forming apparatus, comprising:
a main body which comprises an image forming unit forming an image to a printing medium; and
a plurality of supplying box modules which are disposed to an input side of the printing medium in the main body to have a plurality of steps, and respectively comprise a loading tray on which the printing medium is loaded, a driving unit driving to selectively supply the loaded printing medium to the main body, and a control circuit unit controlling a driving of the driving unit,
the control circuit unit of each of the supplying box modules comprising
a shift register which comprises channels corresponding to the total number of the plurality of supplying box modules, and, if receiving an identifying ID information of the supplying box module from the main body, turns on one channel of the channels corresponding to the identifying ID information; and a multiplexer which outputs an active signal driving the driving unit to the driving unit if the channel turned on by the shift register corresponds to a predetermined identifying ID, wherein the respective control circuit units of the supplying box modules share a signal line.

11. The image forming apparatus according to claim 10, wherein the signal line receives the identifying ID information from the main body.

12. The image forming apparatus according to claim 10, wherein the control circuit unit further comprises an ID setting unit which sets the identifying ID.

13. The image forming apparatus according to claim 10, wherein the one supplying box module comprises a sensor which outputs a sensing signal to the control circuit unit if the amount of the printing medium loaded on the loading try is equal to or less than a predetermined amount, and the control circuit unit outputs the sensing signal to the main body if the identifying ID information received from the main body corresponds to the predetermined identifying ID when receiving the sensing signal.

14. The image forming apparatus according to claim 13, wherein the control circuit unit further comprises:

a second shift register which comprises a plurality of channels, and selectively turns on the channels to correspond to the identifying ID information received from the main body; and a comparing unit which compares whether a turned on state of the plurality of channels of the second shift register corresponds to the predetermined identifying ID or not, and selectively outputs the sensing signal from the sensor depending on a comparison result.

15. The image forming apparatus according to claim 14, wherein the comparing units of the respective supplying box modules are connected mutually by an open collector output to share the signal line outputting the sensing signal to the main body.

16. The image forming apparatus according to claim 13, wherein the main body further comprises a main body control unit which outputs the identifying ID of one supplying box module to the plurality of supplying box modules so that the printing medium loaded on the one supplying box module of the plurality of supplying box modules can be supplied to the image forming unit.

17. The image forming apparatus according to claim 16, wherein the main body control unit determines that a printing medium loaded amount of the supplying box module corresponding to the output identifying ID is equal to or less than a predetermined amount to display an error message in a display unit of the main body if receiving the sensing signal from the plurality of supplying box modules.

18. The image forming apparatus according to claim 10, wherein one of the supplying box modules comprises a pickup roller which is driven by the driving unit to pick up the printing medium on the loading tray to be supplied to the main body.

* * * * *